United States Patent [19]
Chen et al.

[11] Patent Number: 6,079,254
[45] Date of Patent: Jun. 27, 2000

[54] SCANNING FORCE MICROSCOPE WITH AUTOMATIC SURFACE ENGAGEMENT AND IMPROVED AMPLITUDE DEMODULATION

[75] Inventors: Dong Chen; Edwin Flecha; James Michael Hammond; Kenneth Gilbert Roessler, all of Boca Raton, Fla.

[73] Assignee: International Business Machines Corporation, Armonk, N.Y.

[21] Appl. No.: 09/072,230

[22] Filed: May 4, 1998

[51] Int. Cl.[7] .............................. G01B 5/28; G01B 7/34
[52] U.S. Cl. ........................................................ 73/105
[58] Field of Search .............................. 73/105; 250/306

[56] References Cited

U.S. PATENT DOCUMENTS

| | | | |
|---|---|---|---|
| 4,851,671 | 7/1989 | Pohl . | |
| 5,262,643 | 11/1993 | Hammond et al. | 250/306 |
| 5,283,442 | 2/1994 | Martin et al. | 250/561 |
| 5,517,128 | 5/1996 | Henninger | 324/765 |
| 5,589,686 | 12/1996 | Ohara | 250/306 |
| 5,625,142 | 4/1997 | Gamble . | |
| 5,631,410 | 5/1997 | Kitamura | 73/105 |
| 5,907,096 | 5/1999 | Chen | 73/105 |

OTHER PUBLICATIONS

Multifunction Non–Contact Stylus Microscope, *IBM Technical Disclosure Bulletin*, vol. 32, No. 88 Jan., 1990, pp. 39–40.

Fast Image Acquisition with Scanning Tunneling Microscope or Atomic Force Microscope, *IBM Technical Disclosure Bulletin*, vol. 36, No. 03, Mar., 1993, pp. 93–94.

Automatic Approach System in an Atomic Force Microscope for Bringing the Tip Very Clsoe to the Sample, *IBM Technical Disclosure Bulletin*, vol. 37, No. 10, Oct., 1994, p. 635.

*Primary Examiner*—Daniel S. Larkin
*Attorney, Agent, or Firm*—Ronald V. Davidge; Richard A. Tomlin

[57] ABSTRACT

The vibrating probe of a scanning force microscope is brought into engagement with a sample surface in an initial approach process moving the probe toward the sample surface until the amplitude of probe vibration at an excitation frequency is measurably affected by forces between the tip and the sample, and then in a final approach process in which a change in vibration amplitude caused by a dithering vibration superimposed on the excitation vibration exceeds a pre-determined threshold limit. The excitation frequency is reduced if the phase angle of vibrations exceeds another limit, and the amplitude of the excitation driving function is increased as the amplitude or tip vibration falls below a setpoint. During approach and scanning, vibration amplitude is measured through a demodulator having an intermediate reference signal locked in phase with the tip motion signal.

16 Claims, 6 Drawing Sheets

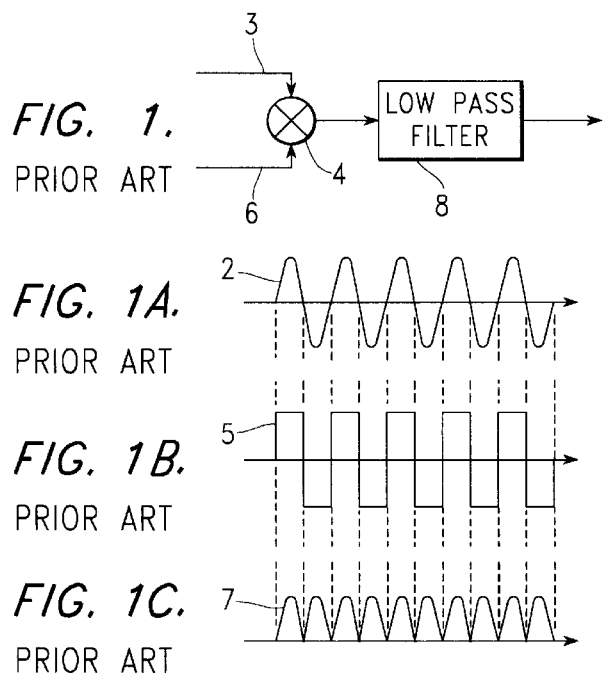
FIG. 1. PRIOR ART
FIG. 1A. PRIOR ART
FIG. 1B. PRIOR ART
FIG. 1C. PRIOR ART
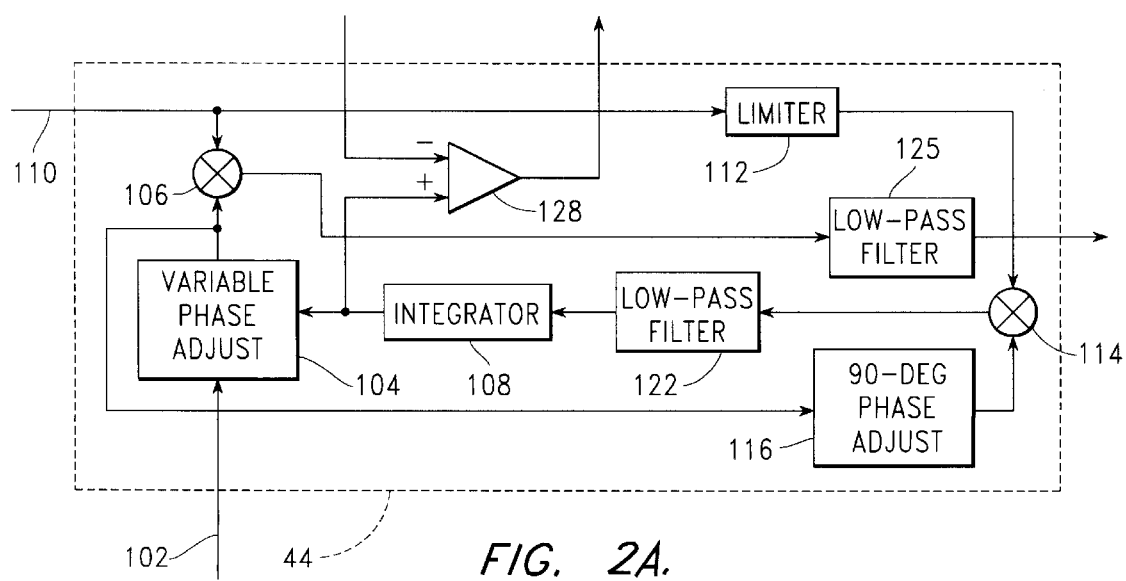
FIG. 2A.

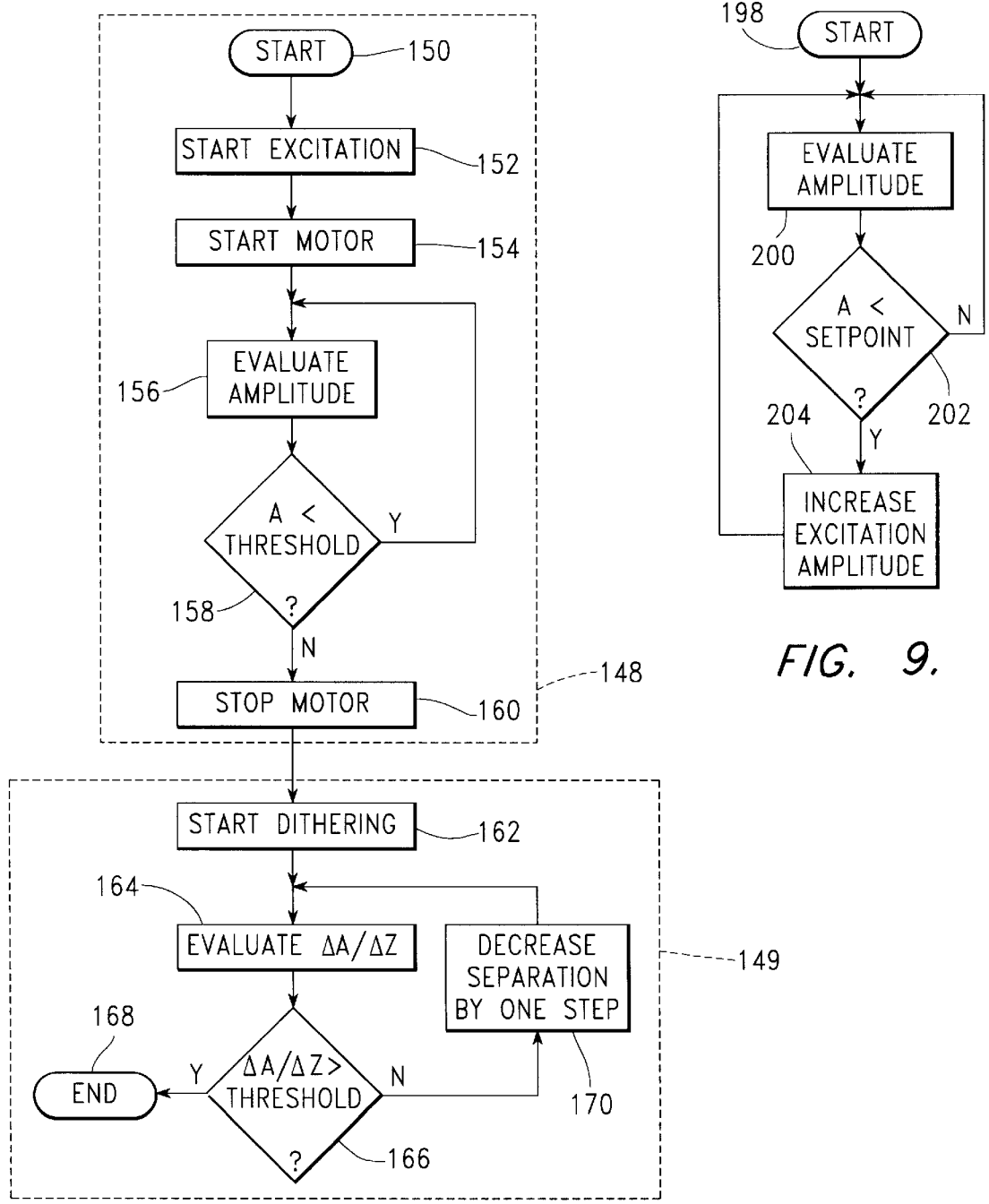
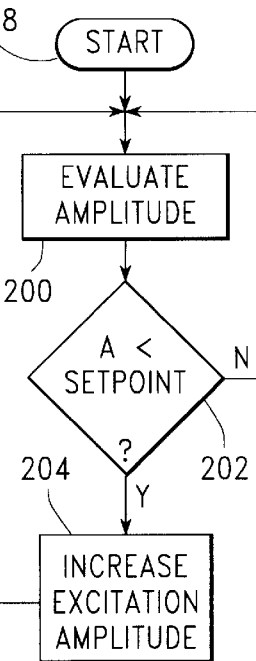
FIG. 5.
FIG. 9.

SCANNING FORCE MICROSCOPE WITH AUTOMATIC SURFACE ENGAGEMENT AND IMPROVED AMPLITUDE DEMODULATION

CROSS-REFERENCE TO A RELATED APPLICATION

This application is related to a copending application, Ser. No. 08/867,138, having common inventorship and a common assignee with the present invention, filed Jun. 02, 1997, the disclosure of which is hereby incorporated herein for reference. This copending application describes a method for controlling the engagement of a scanning force microscope having a segmented piezoelectric actuator.

BACKGROUND OF THE INVENTION

Field of the Invention

This invention relates to a scanning force microscope operating in an AC mode, and, more particularly, to an automatic surface engagement feature for such a microscope, and to amplitude demodulation apparatus for such a microscope.

Background Information

Typically, a non-contact or cyclic-contact scanning force microscope is operated in an AC detection mode, with a cantilever having a probe tip at its distal end being vibrated at or near its resonance frequency, and with the amplitude of vibration of the probe tip being detected by one of a variety of methods. When the tip is brought into proximity with the sample surface, its vibration amplitude becomes a function of interactions between the tip and the sample surface. In non-contact scanning force microscopy, a long-range interaction force gradient alters the resonance characteristics of the cantilever, resulting in variation of the amplitude of vibration. In cyclic-contact scanning force microscopy, a short-range repulsive interaction between the tip and the sample surface dampens the vibration of the cantilever, reducing the amplitude of tip vibration. Therefore, when the amplitude of vibration is regulated as the probe is scanned across the sample surface, a servo control loop is provided to maintain the separation between the tip and the sample surface at a constant level, allowing a map showing properties of the surface to be made.

The optimization of parameters, such as the frequency of vibration, controlling AC-mode scanning force microscopy is critical for obtaining accurate measurements. In a non-contact AC mode, in order to obtain a highly sensitive servo control, the vibration frequency is preferably operated at a value for which the slope of a resonance curve, indicating amplitude as a function of frequency, is greatest. It is further desirable to engage the tip to the surface as closely as possible without contacting the surface. In a cyclic-contact mode, the engagement of the tip with the sample surface is controlled to avoid significant wear of the tip or damage to the sample being measured.

In the non-contact AC mode, before the tip engages the sample surface, the frequency of operation is set at the value corresponding to a steepest point of the resonance curve. However, as the tip approaches the sample surface, the increasing force gradient alters the resonance properties, shifting the resonance curve downward, so that resonance occurs at a lower frequency.

The effect of gradients within a force field on a vibrating cantilever has been described by R. Wiesendanger in *Scanning Probe Microscopy and Spectroscopy—Methods and Applications*, Cambridge University Press, 1994, on pages 241–243. In such a field, the effective spring constant is given by:

$$c_{\mathit{eff}} = c - F' \text{ where } F' = \frac{\partial F_z}{\partial z}$$

In the above equation, c is the spring rate of the cantilever in the absence of a force field, and $c_{\mathit{eff}}$ is the effective spring rate of the cantilever in the presence of the force field. In an attractive force field, with the probe tip being attracted to the surface, the cantilever is effectively softened. In a repulsive force field, with the probe tip being repelled by the surface, the cantilever is effectively stiffened.

The change in the resonant frequency of vibrations of the cantilever/mass system is given by:

$$\omega = \sqrt{\frac{c_{\mathit{eff}}}{m}} = \omega_0 \sqrt{1 - \frac{F'}{c}}$$

In the above equation, m is an effective mass, and $\omega_0$ is the resonant frequency of the system in the absence of a force gradient.

In the present example of approaching the surface in a non-contact AC mode, the force gradient is attractive, so the effective spring constant is lowered, lowering the effective natural frequency of the cantilever. As the tip gets closer to the surface, the resonant frequency shifts lower, moving farther from the constant frequency at which the cantilever is driven. This shift in natural frequency significantly decreases the sensitivity of the servo control due to a decrease in the value of the slope (dA/dω) of the curve of vibration amplitude (A) as a function of vibration frequency (ω). This decrease in sensitivity reduces the ability of the tip to lock properly in the proximity of the surface during the process of approaching the surface. Often, the tip contacts the surface before it locks at the desired level of engagement. Furthermore, when a strong long range interaction is encountered as the tip approaches the surface, the resonant frequency shifts abruptly, causing a rapid decrease in the amplitude vibrations at the operating frequency. The excitation energy causing the cantilever to vibrate must be significantly increased, sometimes to a level not available from the drive circuits of the instrument, in order to maintain a sufficient level of vibration. This problem is particularly severe when a conventional lock-in circuit is employed for amplitude demodulation, since the amplitude signal from the output of the lock-in demodulator depends not only on the vibration amplitude, but also on the phase angle between the driving signal and the vibration signal. When the resonance shift occurs, the phase angle changes, so that the lock-in output signal decreases much faster than the actual vibration amplitude.

What is needed is a method which can automatically sense the tip to sample surface engagement parameters, such as the degree of engagement and the amount of resonance shift. Such a method is needed for use with the adjustment of system parameters, such as vibration frequency, tip to surface separation, and a level of excitation, in real time, so that the conditions of operation are retained in an optimized state during the process of engaging the sample surface with the probe.

FIG. 1 is a schematic view of conventional apparatus used to determine the amplitude of tip vibration in a scanning force microscope. FIGS. 1A–1C are graphical views of signals in this apparatus. In a scanning force microscope, the signal to be examined, which represents the contour of the sample surface or a force field resulting from electrical or magnetic properties of the sample, is modulated by a vibration signal applied to the probe. Thus, this apparatus is generally called a demodulator.

In the apparatus of FIG. 1, a tip vibration signal 2, shown in FIG. 1A, is applied through a first input line 3, to be multiplied in a mixer 4 by a square wave signal 5, shown in FIG. 1B, applied through a second input line 6. The square wave signal 5 has the same frequency as the vibration tip signal 2, with an amplitude of ±1. Since the tip vibration is a result of an excitation signal from an oscillator, the output of the oscillator, having the same frequency, is also used as the square wave signal 5. The resulting intermediate signal 7, shown in FIG. 1C, is fed through a low-pass filter 8 to form a output signal representing the amplitude of the tip vibration signal. In this process, the negative portions of the vibration signal 2 are inverted, being multiplied by (−1), so that both positive and negative portions of the input signal 2 form positive portions of the intermediate signal 7.

A problem with this approach is that the amplitude is properly detected only when the tip vibration signal and the square wave signal are in phase. While the square wave signal 6 is made to match the phase angle of the tip vibration signal 2 with the cantilever vibrating in free space, during the engagement process and during the subsequent process of scanning the surface of the sample, interactions between the vibrating tip and the sample surface cause changes in the phase angle between the signal driving the tip in vibration, and hence the square wave signal 6, and the signal 2 representing measured tip vibration. A variation in phase angle causes portions of the intermediate signal 7 to descend as negative portions, formed by the multiplication of positive portions of the vibration signal 2 by negative portions of the square wave 5, and by the multiplication of negative portions of the vibration signal 2 by positive portions of the square wave 5.

Thus, what is also needed is a method for keeping the square wave signal 6 always in phase with the tip vibration signal 2 during engagement and scanning.

Description of the Prior Art

U.S. Pat. No. 5,262,643 describes a non-contact, stepwise method for automatically positioning a sensing probe having a vibrating cantilever and tip, above a target surface utilizing acoustic and Van der Waals interactions respectively during an approach method, so that the sensing probe is lowered to a substantially optimized tip-to-target-surface distance. The system uses the interaction of forces between the vibrating cantilever and target surface to automatically position the sensing probe above the target surface. The automatic positioning procedure is accomplished in three increasingly precise steps. In the first step, the vibrating sensing probe is lowered quickly to a setpoint position above the target surface, as determined, for example, by an optical focusing system. Steps two and three use the amplitude of vibration of the vibrating cantilever, with the position of the approaching sensing probe being controlled by tracking the amplitude of vibration of the vibrating cantilever as well as tracking an amplitude-distance gradient (dA/dD). This gradient is measured by first producing incremental changes in the amplitude of vibration of the vibrating cantilever by varying the excitation signal in an A.C. fashion. The gradient is then established as the ration of the incremental change amplitude of vibration to the incremental change is tip to target surface gap.

However, during the process of approaching the sample surface using the method of U.S. Pat. No. 5,262,643 the effect of increasing the dA/dD gradient with increases in a force-distance gradient (dF/dD) is opposed by corresponding reductions in the resonant frequency of the vibrating cantilever. Such reductions move the resonant frequency farther away from the frequency at which the cantilever is vibrated during the approach process, reducing the sensitivity of the dA/dD gradient to changes in the force-distance gradient. Thus, what is needed is a way to measure the effect of changes in the resonant frequency of the vibrating cantilever and to change the driving frequency to compensate for such changes.

SUMMARY OF THE INVENTION

In accordance with one aspect of the invention, there is provided a scanning force microscope which operates in an approach mode as a vibrating probe tip is driven into proximity with a surface of a sample to be examined, and in a scanning mode as the vibrating probe tip is moved along the surface to measure its characteristics. In the approach mode, the frequency of tip vibration is preferably varied to maintain a constant phase angle between the motion of the probe tip and the motion of the actuator driving the probe tip in vibration through a cantilever. Operation in the scanning mode follows operation in the approach mode, with vibration of the probe tip in the scanning mode being at the last frequency used in the approach mode.

In accordance with another aspect of the invention, there is provided a method for automatic engagement of the tip of a scanning force microscope, in an AC detection mode, with the probe tip being vibrated at or near its resonant frequency by an excitation voltage signal applied to the excitation segment.

A first component of this method comprises a modulation of the tip to surface distance facilitating the measurement of a value of the slope (dA/dZ) of the curve of vibration amplitude (A) as a function of the tip-to-surface separation. This slope parameter provides information concerning the degree of interaction between the tip and the sample surface. Usually, a larger value of this parameter indicates a stronger interaction between the tip and the surface, and hence a smaller separation between the tip and the surface. Thus, this parameter is used to stop the process of increasing the engagement of the tip to the sample surface.

A second component of this method uses a phase-frequency servo algorithm to monitor the shift in resonance frequency and, accordingly, to adjust the driving frequency in real time, keeping the driving frequency in a desired region of operation at all times.

A third component of this method is a new vibration amplitude demodulation technique. Unlike the conventional lock-in detection method, this technique provides amplitude signals which are not contaminated by variations in the phase angle which result from tip-to-surface interaction.

A fourth component of this method is a step-size-scale algorithm which allows the engagement speed to be increased while maintaining protection of the tip from crashing into the sample surface.

A fifth component of this method is an amplitude-excitation servo algorithm which maintains a certain level of vibration amplitude during the engagement process.

BRIEF DESCRIPTION OF THE DRAWINGS

FIG. 1 is a schematic view of conventional apparatus used to determine the amplitude of tip vibration in a scanning force microscope;

FIG. 1A is a graphical view of an vibrating displacement signal providing a first input to the apparatus of FIG. 1;

FIG. 1B is a graphical view of an oscillator signal used to generate cantilever movement resulting in the displacement signal of FIG. 1A and to provide a second input to the apparatus of FIG. 1;

FIG. 1C is a graphical view of an output signal from the apparatus of FIG. 1;

FIG. 2A is a block diagram of a demodulator within the scanning force microscope FIG. 2;

FIG. 5 is a flow chart of a routine executing within a computer system within the scanning force microscope of FIG. 2 as the vibrating probe tip is brought into engagement with the sample surface;

FIG. 9 is a flow chart of a subroutine executing in within a computer system of the scanning force microscope of FIG. 2 for maintaining the amplitude of tip vibration at a setpoint level, as shown in the graphical view of FIG. 8;

DETAILED DESCRIPTION

Figure 2:
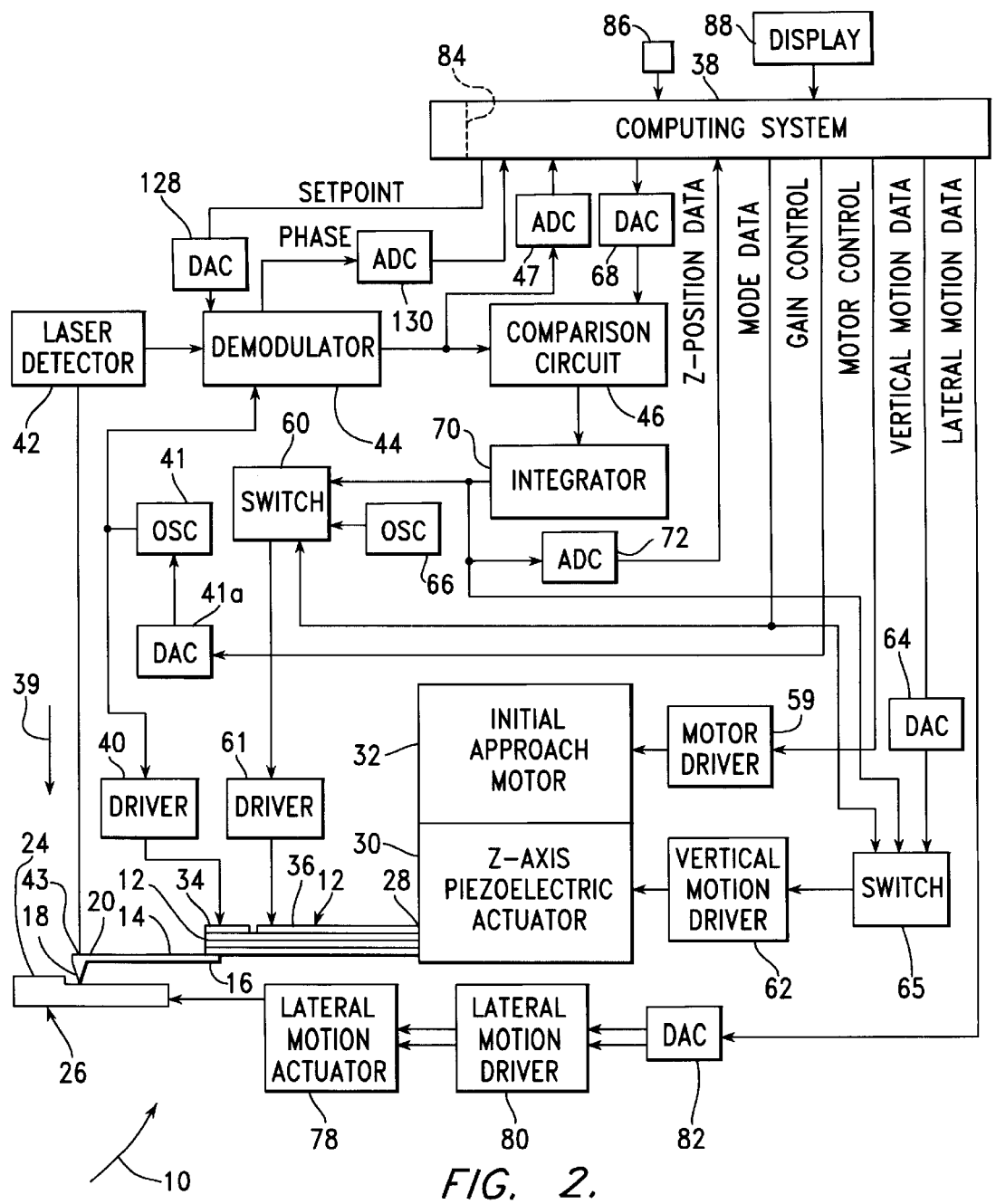
FIG. 2 is a partly schematic side elevation of a scanning force microscope built in accordance with the present invention.

FIG. 2 is a side elevation of a scanning force microscope 10 in which the present invention is employed. This apparatus 10, which is similar in some respects to the apparatus described in the cross-referenced copending application Ser. No. 08/867,138, includes a bimorph piezoelectric actuator 12, to which a cantilever 14 is attached at its proximal end 16. A probe tip 18 is attached to a distal end 20 of the cantilever 14. During the measuring process, the probe tip 18 is vibrated in engagement with the surface 24 of a sample 26. The bimorph piezoelectric actuator 12 is attached at its proximal end 28 to a large-range Z-direction piezoelectric actuator 30, which is in turn attached to a Z-direction drive motor 32 used in the initial approach of the tip 18 to the sample surface 24. The operation of drive motor 32 is terminated when the probe tip 18 has moved so close to sample surface 24 that the vibration of the tip 18 is affected by interactions between the tip 18 and the sample surface 24. The bimorph piezoelectric actuator 12 includes an excitation segment 34 and a dithering segment 36.

During the final portion of the process of engaging the probe tip 18, in the scanning force microscope 10 operating in accordance with the present invention, the vibration of probe tip 18 at a first frequency is preferably modified by the addition of a dithering signal having a second frequency, which is significantly lower than that of the first frequency. In the exemplary apparatus of FIG. 2, vibration at the first frequency is achieved by applying an excitation driving signal to the excitation segment 34, while modification of this vibration at the second frequency is achieved by applying a dithering driving signal to the dithering segment 36. Thus, during the process of engagement with the sample surface 24, the excitation segment 34 and the dithering segment 36 produce a modified vibration of the probe tip 18, while the probe tip 18 is moved toward the sample surface 24 first by the Z-direction drive motor 32 and then by the large-range Z-direction piezoelectric actuator 30.

For example, the first frequency of vibration, which is applied to the cantilever 12 through the excitation segment 34, is typically in a range of 50–500 Khz, depending on the spring constant and mass of the cantilever 12 and on the mass of the probe tip 18, while the second frequency of vibration, which is applied through the dithering segment 36, is in the range of 5–50 hz.

The process of bringing the probe 18 into proximity with the sample surface 24, and the subsequent process of scanning the sample surface 24 to determine its characteristics are controlled by a computing system 38, which generates encoded MODE DATA to indicate whether the system is in the first or second portions of the approach mode, as the probe 18 is being brought into proximity with the sample surface, or in the scanning mode, as the sample surface 24 is examined.

During both the approach and scanning modes, probe tip 18 is vibrated in the engagement direction of arrow 39 and opposite thereto by means of the piezoelectric excitation segment 34, to which a voltage signal is applied through a driver circuit 40. This driver circuit 40 is driven by an oscillator 41, which preferably has an output level set according to a GAIN CONTROL signal from the computing system 38, through a digital-to-analog convertor 41a. This vibrating motion of probe tip 18, in the engagement direction of arrow 39 and opposite thereto, is measured by a laser detector 42, which uses optical means to develop a motion signal indicating the movement of probe tip 18. The optical means may, for example, use interferometry to indicate changes in an optical path length. Alternately, the position at which an obliquely incident laser beam, reflected off a surface of the probe, strikes a photodetector, may be used to determine changes in the probe position. In either case, this output is based on the movement of a reflective surface 43 moving with the probe tip 18. The laser detector includes a band-pass filter which allows the transmission therefrom of an output signal including frequencies in the range of the signal driving the excitation segment 34 while preventing the transmission of frequencies far from this range. The output of the laser detector 42 is provided as an input to a demodulator 44, which will be described in detail in reference to FIG. 2A. The output of demodulator 44 is used as an input indicating vibration amplitude to a comparison circuit 46 and to the computing system 38 through an analog-to-digital convertor 47.

During an initial portion of the approach mode, the probe tip 18 is driven in the engagement direction of arrow 39 by means of the initial approach motor 32, which is operated by a motor driver circuit 59 in response to a MOTOR CONTROL signal from the computing system 38. Also during this initial portion of the approach mode, the dithering segment 36 is not operated, with the mode switch 60, in response to the MODE DATA from computing system 38, having shut off the input to a driver 61 operating the dithering segment 36. This portion of the approach mode is terminated, with the MOTOR CONTROL signal being turned off, when the amplitude signal supplied to computing system 38 through analog-to-digital convertor 47 indicates that the probe tip 18 has moved so close to sample surface 24 that interactions between the probe tip 18 and the sample surface 24 are causing changes in the amplitude of the measured vibration of the probe tip 18.

During a final portion of the approach mode, the probe tip 18 is driven in the engagement direction of arrow 39 by means of the Z-axis piezoelectric driver 30, to which a voltage signal is applied through a vertical motion driver 62. This voltage signal is generated in response to an encoded VERTICAL MOTION DATA from computing system 38. This encoded signal is changed into an analog signal within a digital-to-analog convertor 64, and is directed to the vertical motion driver 62 through a switch 65 operating in response to the MODE DATA. During this final portion of the approach mode, the MODE DATA from computing system 38 also causes the mode switch 60 to allow the dithering segment 36 to be driven by an oscillator 66, causing the dithering vibration movement of probe tip 18. This final portion of the approach mode is preferably terminated in accordance with an automatic approach feature to be discussed below.

During operation in the scanning mode, the dithering segment 36, with the oscillating dithering signal turned off, is preferably used to maintain the distance between the probe tip 18 and the sample surface 24 within a predetermined range, causing the probe tip 18 to move upward and downward with changes in the topography of the sample surface 24, as these changes are encountered through the lateral scanning motion of the sample 26. The comparison circuit 46 generates a correction signal which is a difference between the control signal sent from computing system 38 through a digital-to-analog convertor 68 and the output from demodulator 44. Thus, the control signal provides a setpoint level determining the vibration amplitude at which the probe tip 18 is operated. The correction signal from comparison circuit 46 is applied as an input to an integrator 70, in which an accumulation of the changes, required by movement of the vibration amplitude from the setpoint amplitude associated with the correction signal, is developed and stored. At all times during the operation of the device in the scanning mode, the output of integrator 70 represents the locally measured elevation of the sample surface 24. The output of integrator 70 is thus fed as an input to an analog to digital convertor 72, which provides a digital Z-POSITION DATA as an input to the computing system 38.

During scanning, switching circuit 60 applies this output signal from integrator 70 to the driver circuit 61, causing the dithering segment 36 to move the probe tip 14 as required to maintain the output at a level corresponding to the control signal provided as an input to the comparison circuit 46 from the computing system 38. That is, if the amplitude signal from demodulator 44 is too high, the probe tip 14 is lowered, in the direction of arrow 39; if the amplitude signal is too low, the probe tip is raised, opposite the direction of arrow 39.

The computing system 38 samples the output of analog-to-digital convertor 72 to determine the voltage being applied to vertical driver 61. Since this voltage indicates the deflection achieved within the piezoelectric actuator segment 36, and since this segment 36 is being driven during scanning movement of the sample 12 through a servo loop to maintain a pre-determined level of engagement with the sample surface 24, the Z-position data from analog-to-digital convertor 72 provides an accurate description of the level of sample surface 24.

During scanning, the sample 26 is moved so that the sample surface 24 is presented for measurement under the vibrating probe tip 18. This movement is accomplished through the use of a lateral motion actuator 78, which provides mutually perpendicular X- and Y-direction movements, which are each also perpendicular to the direction of engagement indicated by arrow 39. For example, the sample 26 may be moved in such a way that a line formed on the surface 24 in the form of a raster pattern is contacted by the vibrating probe tip 18. The piezoelectric lateral motion actuator 78, is driven by a lateral motion driver 80, which is in turn driven in accordance with signals from a digital-to-analog convertor 82. The LATERAL MOTION DATA from computing system 38 includes certain bits which are decoded into a desired position of the sample 26 in the X-direction, while other bits are decoded into a desired position of the sample 26 in the Y-direction.

Computing system 38 includes an internal random access memory 84 in which the data resulting from various measurements is stored, means for reading a program stored in a computer readable media 86, and a display device 88 for displaying results of measurements.

While the previous discussion describes the dithering segment 36 being used to provide movement in and opposite the engagement direction of arrow 39 in response to changes in surface topography encountered during operation in the scanning mode, the Z-axis piezoelectric actuator 30 is alternatively used for this purpose, with switch 65 directing the output of integrator 70 to vertical motion driver 62, and with switch 60 opening a circuit directing this output to dithering driver 61. Both of these switches 60, 65 operating in response to MODE DATA from the computing system 38. Since the dithering segment actuator 36 moves rapidly in response to small changes in surface topography, and since the Z-axis piezoelectric actuator 30 moves through a larger linear range at a slower rate, the decision of which actuator 36, 30 to use for this purpose is preferably made based on the characteristics of the sample surface to be measured. Within the scope of the present invention, a scanning force microscope may use either exclusively, instead of both, of these actuators 36, 30 for this purpose.

FIG. 2A is a block diagram of the demodulator 44 of FIG. 2. This demodulator 44, which is built in accordance with the present invention, provides an important advantage, when compared to a conventional demodulator described above in reference to FIGS. 1 and 1A–1C, of providing an accurate indication of the amplitude of a vibration signal despite variations in the phase angle of these vibrations relative to the oscillator signal used to drive the vibrations. In the present example of a scanning force microscope, such variations in phase angle are expected to occur due to forces resulting from an interaction between the vibrating probe tip and the sample surface.

Figure 2B:
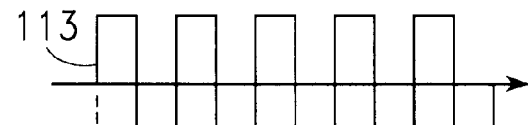
FIG. 2B is a graphical view of the output signal of a limiter within the demodulator of FIG. 2A.
Figure 2C:
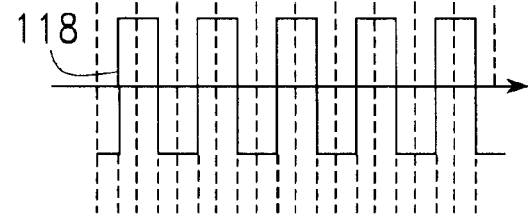
FIG. 2C is a graphical view of a signal, within the demodulator of FIG. 2A, having a 90-degree phase angle relationship with the signal of FIG. 2B.
Figure 2D:
FIG. 2D is a graphical view of a signal resulting from the multiplication of the signal of FIG. 2B by the signal of FIG. 2C within the demodulator of FIG. 2A.
Figure 2E:
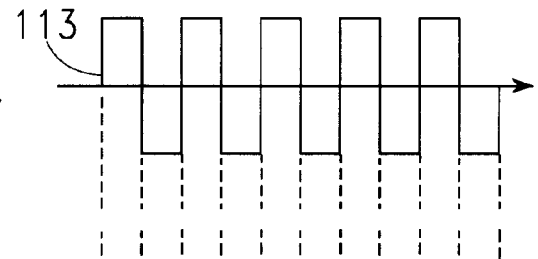
FIG. 2E is a graphical view of the output signal of a limiter within the demodulator of FIG. 2A.
Figure 2F:
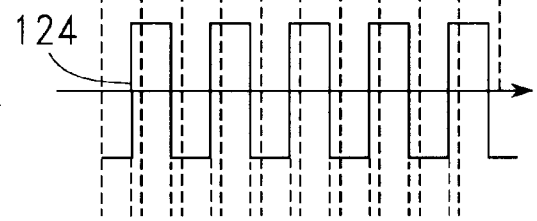
FIG. 2F is a graphical view of a signal, within the demodulator of FIG. 2A, having a greater than 90-degree phase angle relationship with the signal of FIG. 2E.
Figure 2G:
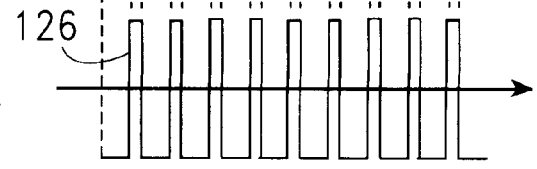
FIG. 2G is a graphical view of a signal resulting from the multiplication of the signal of FIG. 2E by the signal of FIG. 2F within the demodulator of FIG. 2A.

FIGS. 2B–2D are graphical views of signals occurring within the demodulator 44 under condition of a zero-degree phase angle. FIGS. 2E–2G are graphical views of signals occurring with the demodulator under conditions of a phase angle exceeding zero degrees.

Referring to FIGS. 2 and 2A–2G, the output of oscillator 41, in the form of a square wave signal is provided to the demodulator 44 on an input line 102 directed as an input to a variable phase adjustment circuit 104. This circuit 104 adjusts the phase angle between its input on line 102 and its output to a first multiplier 106, according to an adjustment signal from an integrator 108. The output signal from laser detector 42, which describes the movement of vibrating probe tip 18, is applied as an input to oscillator 41 along input line 110 extending to a limiter 112. The output signal 113 of this limiter 112, which approximates a square wave signal, is applied as an input to a second multiplier 114. The output of variable phase adjusting circuit 104 is directed through a 90-degree phase adjusting circuit 116 to form the other input to second multiplier 114.

As shown in FIGS. 2B–2D, if the output signal (not shown) from variable phase adjusting circuit 104 is in phase with the output signal 113 from limiter 112, multiplying the resulting output signal 118 from 90-degree phase adjusting circuit 116 by the signal results in an output signal 120 from second multiplier 114 having similar curves on each side of the zero-voltage line. When such a signal 120 is driven through a low-pass filter 122 to average the signal, a zero-voltage signal is applied as an input to the integrator 108.

On the other hand, as shown in FIGS. 2E–2G, if the output signal (not shown) from variable phase adjusting circuit 104 is not in phase with the vibration signal from laser detector 42, multiplying the resulting output signal 124 from 90-degree phase adjusting circuit 116 by the signal 113 from limiter 112 results in an output signal 126 from second multiplier 114 which does not have similar curves on each side of the zero-voltage line. In this example, the phase angle between the vibration signal and the signal 24 is greater than 90 degrees, and the passage of the resulting signal 126 through low-pass filter 122 results in a negative input signal to integrator 108.

Thus, the output of a first low-pass filter 122 provides an error signal indicating a phase difference between the output of variable phase adjusting circuit 104 and the input vibration signal. Integrator 108 accumulates the error signal low pass filter 122, providing an output voltage indicating the phase angle difference between the output of variable phase adjusting circuit 104 and the vibration signal on input line 110. This output voltage from integrator 108 is applied to variable phase adjust circuit 104, causing the phase adjustment process within this circuit 104 to adjust the phase angle of the output signal from this circuit 104 to correct for changes in the phase angle between this output signal and the output signal from limiter 112. In this way, the output signal from the variable phase adjustment circuit 104 becomes an intermediate signal which is locked in phase with the amplitude signal on input line 110. Therefore, when the vibration signal from input line 110 is multiplied by the intermediate signal in first multiplier 106, the results occur as described above in reference to FIGS. 1A–1C, with the resulting output from a second low-pass filter 125 providing an accurate measure of the amplitude of the vibration signal in spite of phase differences between this signal and the output signal of oscillator 41.

The output of integrator 108 is preferably also provided as an input to a differential amplifier 126. The other input to this amplifier 126 is a phase angle generated within a digital-to-analog convertor 128 from a SETPOINT signal from the computing system 38. The output of differential amplifier 126 is provided as an input to an analog-to-digital convertor 130, which returns an encoded signal to the computing system 38, indicating the difference between the actual phase angle of the vibration signal from laser detector 42 and the phase angle represented by the SETPOINT signal.

Figure 3:
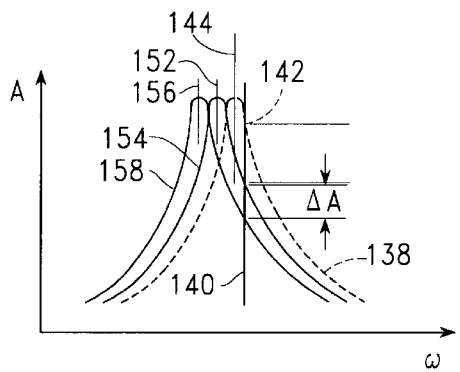
FIG. 3 is a graphical view of an amplitude of tip vibration as a function of driving frequency, under various conditions of engagement with a sample surface within the scanning force microscope of FIG. 2.

FIG. 3 is a graphical view of the vibration amplitude (A) of probe tip 18 (shown in FIG. 2) as a function of the frequency of vibration ($\omega$), under various conditions of engagement between the tip 18 and the sample surface 24.

Referring to FIGS. 2 and 3, a rightmost curve 138 indicates this amplitude function with the cantilever 14 being vibrated in free space, far enough from the sample surface 24 that there is no interaction with this surface. The engagement process is begun with the cantilever 14 being vibrated at a frequency 140 corresponding to a point 142 on the curve 138 having the greatest negative slope. This frequency 140 is somewhat above the natural frequency 144 of the cantilever 14 under the condition of vibration in free space.

Figure 4:
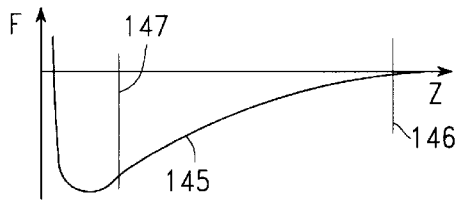
FIG. 4 is a graphical view of an interactive force between a vibrating probe tip and a sample surface within the scanning force microscope of FIG. 2, showing variations in the force with engagement between the vibrating probe tip and the sample surface.

FIG. 4 is a graphical view showing a curve 145 of the force (F) produced by the interaction between the tip 18 and the sample surface 24, as a function of the distance (Z) between the tip 18 and the sample surface 24. Negative values of the force (F) indicate that the force is attractive, while positive values of the force (F) indicate that the force is repulsive. The slope (dF/dZ) of this force curve indicates the presence of a gradient in the force field which alters the resonant frequency of the cantilever 14 by changing its effective stiffness. This slope (dF/dZ) increases continuously as the separation distance (Z) is reduced between point 146 and point 147.

Referring to FIGS. 2–4, while the probe tip 18 remains relatively far from the sample surface 24, for example at point 46 in FIG. 4, modifying the probe tip vibration by means of the dithering signal applied to dithering segment 36 has little or no effect, since significant engagement forces are not encountered. However, as the sample surface is approached, reducing the value of the separation distance (Z), the slope (dF/dZ) of the force curve increases, so that the resonant frequency of cantilever 14 is decreased to a frequency 152 on a curve 154 indicating amplitude (A) as a function of frequency ($\omega$) when the probe tip 18 is moved away from the sample surface 24 by the dithering motion from dithering segment 36, and to an even lower resonant frequency 156 on a curve 158 when the probe tip 18 is moved toward the sample surface 24 by the dithering motion. With the cantilever 14 still being vibrated at the driving frequency 144, an amplitude difference (ΔA) occurs between the vibration amplitude (A) occurring with the probe tip 18 moved away from the sample surface 24 by dithering and the vibration amplitude (A) occurring when the probe tip is moved toward the sample surface 24. This amplitude difference (ΔA) occurs as the probe tip 18 is moved by dithering through a differential separation distance (ΔZ). The slope (dA/dZ) of a curve of amplitude (A) as a function of separation distance (Z) is thus approximated by the ratio (ΔA/ΔZ) of the amplitude difference (ΔA) from dithering to the separation distance (ΔZ) from dithering. Thus, the amplitude of vibration of tip 16 resulting from the signal applied to excitation segment 34 is modulated at the frequency of the signal applied to the dithering segment 36, with the change in amplitude being determined by the slope of curve 145.

FIG. 5 is a flow chart showing steps of a routine executed in computing system 38 during the process of approaching the sample surface 24 with the probe tip 18 (all shown in FIG. 2). This routine includes a first routine 148, in which the probe tip 18 is driven to an intermediate level of engagement by means of the initial approach motor 32, followed by a second routine 149, in which the probe tip 18 is driven into the level of engagement desired for the scanning process.

Referring to FIGS. 2 and 5, the process begins at start block 150, with a decision being made to start the approach process. Next, in step 152, the excitation vibration through excitation segment 34 is turned on, and, in step 154, the drive motor 32 is started. In step 156, the amplitude (A) of vibration of tip 18 is evaluated to determine if the tip 18 has been moved close enough to the sample surface 24 for this parameter to be effected, as indicated by the amplitude (A) having dropped below a predetermined threshold value. If the tip 18 has not been moved this close, the system returns to step 154, continuing to drive the motor 32 from decision block 158. If the system has moved this close, the system proceeds to step 160 from decision block 158, stopping operation of the motor 32. From this point, the large range piezoelectric actuator 30 is used to continue the process of approaching the sample surface 24 with the probe tip 18.

Continuing to refer to FIGS. 2 and 5, and referring additionally to FIG. 4, since the slope of curve 145, indicating the differential of force with respect to engagement distance (dF/dZ) increases continuously as the engagement distance is decreased from a value 146 to a value 147, the corresponding values of dA/dZ must also increase continuously over this range. Thus, a predetermined level of the derivative of amplitude with respect to separation distance (dA/dZ), as represented by a threshold value of the ratio of amplitude difference to separation distance difference (ΔA/ΔZ), with the distance difference (ΔZ) being determined by a predicted distance the probe is moved by dithering thought the signal applied to dithering segment 36, and with the amplitude difference (ΔA) being determined by the level of amplitude modulation occurring with the dithering motion.

Thus, after the motor 32 is stopped in step 160, dithering is started, by applying a signal to the dithering segment 36, in step 162. The amplitude modulation due to dithering is evaluated in step 164. If the ratio (ΔA/ΔZ) is greater than a predetermined threshold value, as determined in decision block 166, the engagement process is stopped in block 168. Stopping the engagement process means that the engagement distance (Z) is left at its present value and that the dithering signal is terminated. If the ratio (ΔA/ΔZ) is not greater than a pre-determined threshold value, as determined in decision block 166, the drive voltage applied to the piezoelectric actuator 30 is increased by an incremental amount in step 170, so that the tip 18 is moved one step closer to the sample surface 24. This process is repeated until the ratio (ΔA/ΔZ) is greater than a pre-determined threshold value.

In accordance with a preferred embodiment of the present invention, the step size used in step 170 is determined in accordance with a comparison between the actual value of the ratio (ΔA/ΔZ) measured in step 164, in a manner causing the step size to decrease as the threshold value of (ΔA/ΔZ) is approached. For example, with a parameter (n) being defined as a ratio between the measured value of (ΔA/ΔZ) and its threshold value, the step size is generated in the following manner:

$$n = \frac{\frac{\Delta A}{\Delta Z}}{\text{THRESHOLD}}$$

$$\text{STEP SIZE} = (n^k - 1)(\text{MIN STEP})$$

In the above equation, the exponential constant (k) is equal to one for linear scaling or larger than one for non-linear scaling. The parameter (MIN STEP) is chosen to determine the size of the scaled steps. This method allows the speed of engagement to be significantly increased when the ratio (ΔA/ΔZ) is much smaller than the threshold value, while maintaining a low speed of engagement as the threshold value is approached, preventing the probe tip 18 from crashing into sample surface 24.

Figure 6:
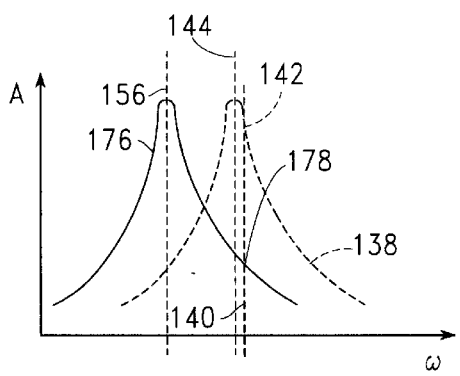
FIG. 6 is a graphical view similar to FIG. 3, except that a larger variation in natural frequency due to a change in engagement with the sample surface is shown.
Figure 6A:
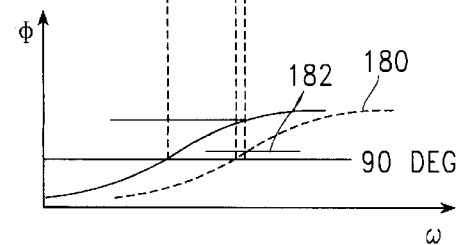
FIG. 6A is a graphical view of the phase angle between a signal driving cantilever vibration and the vibrating tip of FIG. 6.

FIG. 6 is a graphical view of the amplitude (A) of vibrations of probe tip 18 and of the phase angle (φ) between the driving signal applied to excitation segment 34 and the motion of the probe tip 18.

Referring to FIGS. 2 and 6, the process through which the probe tip 18 approaches the sample surface 24 begins with the cantilever being vibrated at the excitation frequency 140 corresponding to the steepest negative slope of the curve 138, representing the vibration amplitude (A) as a function of frequency (ω) under conditions of free vibration of the cantilever 14. Under certain circumstances, as the probe tip 18 is moved closer to the sample surface, the curve representing the vibration amplitude (A) as a function of frequency (ω) moves significantly lower in frequency, as represented by curve 176. This curve movement occurs particularly if the force gradient (dF/dZ) has a particularly large characteristic length, i.e. a long interaction distance.

If the cantilever 14 is vibrated in the conventional manner at the original drive frequency 140 throughout the approach, the resulting point 178 on the new curve 176 is so low on this curve that the sensitivity of the modulation of amplitude (A) to changes in separation distance (Z) with dithering is significantly lowered. Since this condition prevents the ratio (ΔA/ΔZ) from rising to exceed the threshold value with which a comparison is made in step 166 of FIG. 5, the probe 18 is allowed to crash into the surface 24, with potential damage to both the probe 18 and the sample 26.

A curve 180 represents the phase angle (φ) under the conditions of the free-vibration amplitude curve 136. Under conditions of resonance at frequency 140, this phase angle (φ) has a value of 90 degrees, with the force applied to cantilever 14 from excitation segment 34 being in the direction of the velocity of tip 18. As the excitation frequency (ω) is reduced below resonance, the phase angle (φ) asymptotically approaches a value of zero degrees, at which the tip 18 and the distal end of the excitation segment 34 move together in phase. As the excitation frequency (ω) is increased above resonance, the phase angle (φ) asymptotically approaches a value of 180 degrees. The initial excitation frequency 140 used in the approach process is thus associated with a phase angle 182 which is somewhat greater than 90 degrees.

During the approach process, as the amplitude function moves from that represented by curve 138 toward that represented by curve 176, the phase angle function represented by curve 180 moves with the amplitude function, causing the phase angle (φ) to increase above the level of phase angle 182.

Figure 7:
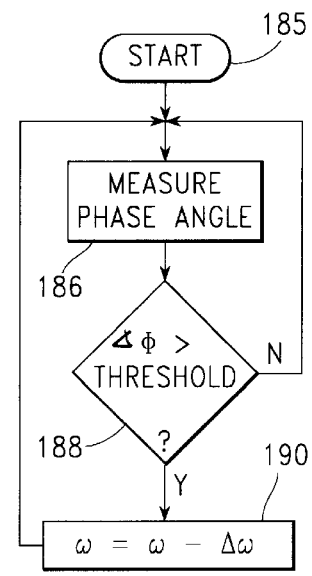
FIG. 7 is a flow chart of a subroutine executing within a computer system of the scanning force microscope of FIG. 2 for decreasing the drive frequency of cantilever vibration to correct for changes in phase angle as the vibrating probe tip is brought into engagement with the sample surface.

FIG. 7 is a block diagram of a routine executing in the computing system 38 during the process of approaching the sample surface 24 with the probe tip 18 being moved by the large range piezoelectric actuator 32 (all shown in FIG. 2), in accordance with a preferred form of the present invention. This routine may be operating through multitasking along with the subroutine 149 of FIG. 5., alternating operation of these two routines may be provided, or the steps of the routine of FIG. 6 may be placed within the steps of the routine 149 of FIG. 5.

Referring to FIGS. 2, 6, and 7, in the routine of FIG. 7, variations in the phase angle between the movement of probe 18 and the signal driving excitation segment 34 are used to determine how changes in the frequency (ω) of the signal driving excitation segment 34 should be made to maintain vibration at a phase angle corresponding to the region of the curve of amplitude (A) as a function of frequency (ω) having the steepest negative slope. A phase angle 182, somewhat above 90 degrees, is chosen as a threshold frequency. After beginning in step 185, the routine of FIG. 7 proceeds to step 186, in which the phase angle (φ) is measured, preferably through the use of the output of differential amplifier 128 (shown in FIG. 2A) forming a part of demodulator 44, and in step 188, this measured phase angle (φ) is compared with the pre-determined threshold phase angle 182. If the measured phase angle (φ) is less than the threshold phase angle 182, the system returns to step 186, so that the measurement and comparison process is repeated. If the measured frequency is greater than the threshold phase angle 182, a pre-determined incremental frequency (Δω) is subtracted from the frequency of excitation in step 190 to form a new frequency of excitation, before the system returns to step 186.

When the methods explained above in reference to FIGS. 5 and 7 are combined, phase angle measurements are made as the distance separating the probe tip 18 from the sample surface 24 decreases cyclically, due to dithering, as well as progressively, due to the movement made through long range piezoelectric actuator 30. To stabilize the process of measuring the phase angle, it is desirable that such measurements be made at a consistent point within the dithering cycle. For example, the phase angle is measured each time dithering reduces the distance between the probe tip 18 and the sample surface 24 to a minimum level. Alternately, phase angle measurements may be averaged to minimize the effects of dithering.

The preceding discussion in reference to FIGS. 3–7 has dealt with a reduction in vibration amplitude occurring as the separation distance between the probe tip 18 and the sample surface 24 is decreased, due to a decrease in the resonant frequency of the cantilever 14, and in a means for correcting this reduction in amplitude by reducing the frequency at which the excitation segment 34 is driven. In addition to this effect, the amplitude of tip vibration is reduced as the separation distance is reduced during the approach process due to an increased level of vibration damping occurring as the tip 18 approaches the sample surface 24. In accordance with a preferred version of the present invention, compensation for this reduction in amplitude is achieved by increasing the amplitude of this voltage signal driving excitation segment 34.

Figure 8:
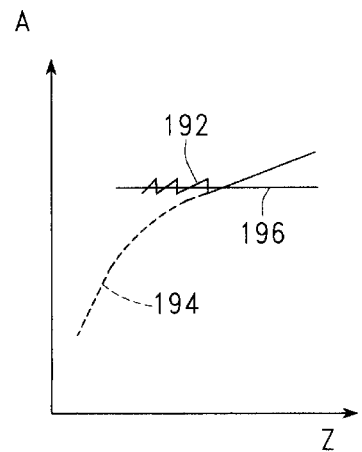
FIG. 8 is a graphical view of the amplitude of a vibrating probe tip in the scanning force microscope in FIG. 2, with the tip vibration amplitude being corrected by increasing the amplitude at which the cantilever is driven.

FIG. 8 is a graphical view of the vibration amplitude of the tip 18 approaching the sample surface 22 with amplitude corrections being made by increasing the amplitude of the voltage signal driving excitation segment 34. As this surface 22 is approached the separation distance (Z) is decreased. The amplitude (A) follows a line 192. Without correction, the amplitude (A) would further decrease along a dashed line 194. However, after a setpoint line 196 is crossed, with the next measurement of vibration amplitude (A), an increase in the amplitude of the driving signal returns the vibration amplitude (A) upward in an incremental step determined by the incremental increase in the amplitude of the driving signal.

FIG. 9 is a block diagram of another routine executing in the computing system 38 during the process of approaching the sample surface 24 with the probe tip 18 being moved by the large range piezoelectric actuator 32 (all shown in FIG. 2), in accordance with a preferred form of the present invention. This routine may be operating through multitasking along with the subroutine 149 of FIG. 5., alternating operation of these two routines may be provided, or the steps of the routine of FIG. 9 may be placed within the steps of the subroutine 149.

Referring to FIGS. 2, 5, and 9, the routine of FIG. 9 is started in step 198 when it becomes necessary to track amplitude changes, perhaps at the start of subroutine 149 of FIG. 5. In step 200, the tip vibration amplitude (A) is evaluated. If this amplitude is not less than a pre-determined setpoint level, indicated by line 196, the system returns from decision block 202 to evaluate the amplitude in step 200 at periodic intervals. If this amplitude is less than the predetermined setpoint level, the amplitude of the voltage signal driving the excitation segment 34 is increased in step 204, and the system returns to step 200 to continue evaluating the amplitude at periodic intervals.

The preceding discussion has described the subroutine 149 of FIG. 5, for using dithering to evaluate a (ΔA/ΔZ) ratio used to determine when the approach of the probe tip 18 to the sample surface 24 has been completed, the subroutine of FIG. 7 for decreasing the frequency of vibration to maintain a phase angle relationship between the voltage signal driving the excitation segment 34 and the vibration of the tip 18, and the subroutine of FIG. 9, in which the amplitude of the voltage signal driving the excitation segment 34 is increased to compensate for increases in damping occurring with increased engagement between the tip 18 and the surface 24. The routines can be used individually or in combination, with multitasking occurring within the computing system 38.

Figure 10:
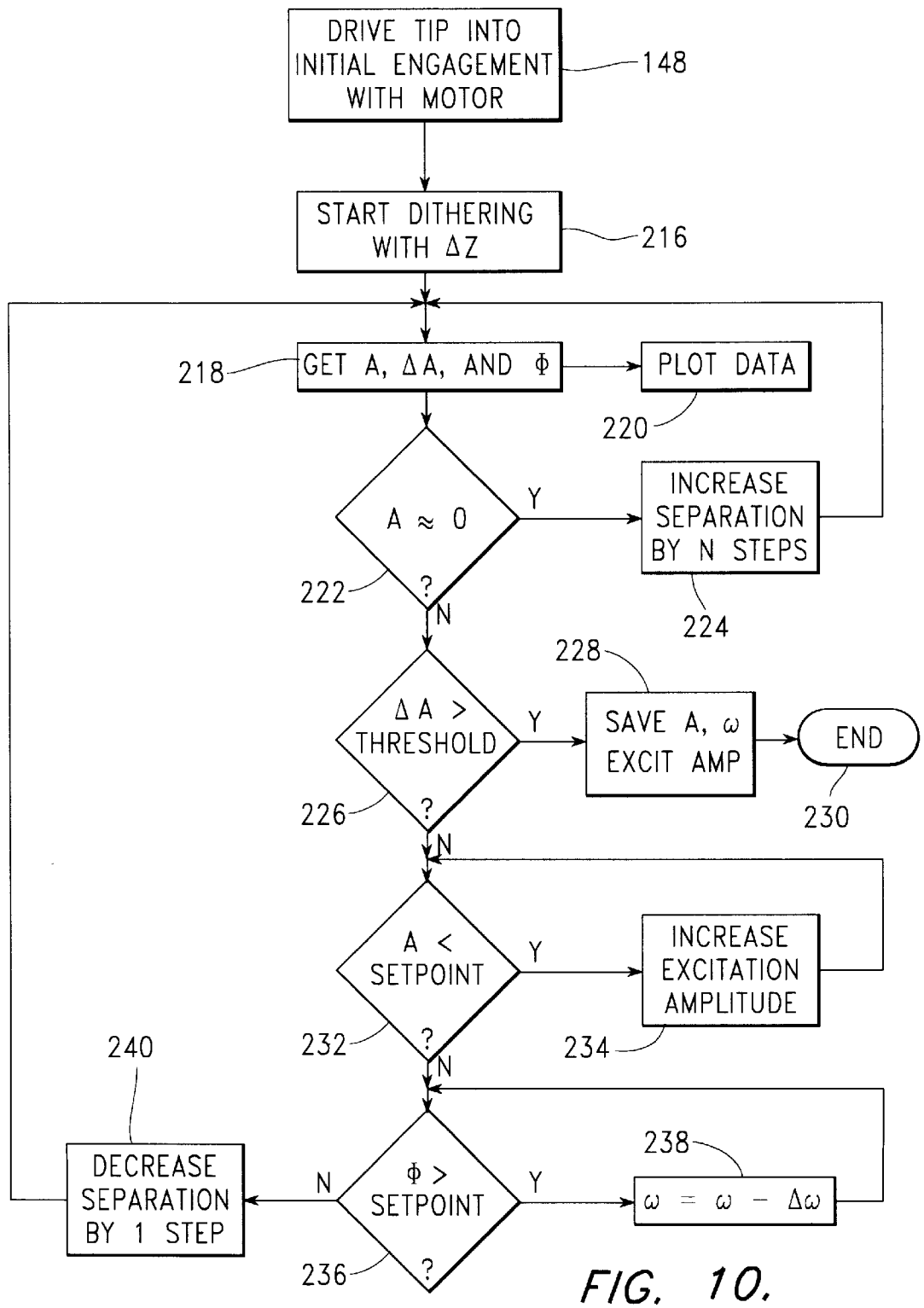
FIG. 10 is a flow chart of a routine executing within a computer system within the scanning force microscope of FIG. 2 as the vibrating probe tip is brought into engagement with the sample surface, with several parameters being checked during each pass through the routine, and with corrections being made as needed.

FIG. 10 is a flow chart showing a routine which is alternately executed within the computing system 38 to achieve simplicity of operation, along with the functions of the subroutines of FIGS. 5, 7, and 9.

Referring to FIGS. 2 and 10, the routine of FIG. 10 begins with the subroutine 148, which is described above in reference to FIG. 5, for driving the probe tip 18 into an initial, or intermediate level of engagement with the surface 24. Next, in step 216, the dithering process is started, with a low-frequency voltage signal being applied to the dithering piezoelectric section 36. Next, in step 218, the parameters of vibration amplitude (A), the change in vibration amplitude with dithering (ΔA), and the phase angle (φ) between the voltage signal driving the excitation actuator 34 and the vibration of tip 18. At this point, these measured parameters are either used in step 220 to plot or display data, or data corresponding to these parameters are stored for subsequent plotting or display. The change in amplitude parameter (ΔA) is measured as a change occurring with the cycles of the dithering process. The other parameters (A,φ) are affected by dithering, and may be provided as averages of measured signals, smoothing the variations occurring with dithering, or as signals measured at a particular point in the dithering process, such as at the point at which dithering has provided a maximum reduction in the spacing between tip 18 and surface 24.

Next, in step 222 a determination is made of whether the level of the vibration amplitude (A) is close to zero. If it is close to zero, as determined in step 224, the separation is increased by a number of steps, with an assumption having been made that the separation appears to be already too small. The system then returns to remeasure the parameters in step 218.

If the amplitude (A) is not close to zero, as measured in step 222, the system continues to step 226, where the variation in amplitude (ΔA) with dithering is compared with a threshold value representing the level of this parameter under the conditions of this parameter desired for the scanning process. If this value is beyond the threshold value, as measured in step 226, the values of the separation distance (Z) and frequency (ω) are saved, in step 228, for use in the subsequently-performed scanning process. If the driving function (excitation) amplitude has also been increased, this increased level is preferably also saved for use in the scanning process. Next, in step 230 the tip approach routine of FIG. 10 is ended, leaving the probe tip 18 in the condition of separation, from the sample surface 24, required for traversing the sample surface during scanning.

The reasons behind this type of operation are explained in more detail in reference to FIGS. 4 and 5. This comparison of a variation in amplitude (ΔA) with a threshold value in FIG. 10 corresponds with a comparison of a ratio (ΔA/ΔZ) in subroutine 149 of FIG. 5. Either of these parameters may be used with either of the routines, as their use in either routine is provided by reason of example. Since the vibration imparted by dithering is far below the natural frequency of cantilever 14, the phase angle between the dithering voltage signal applied to segment 36 and the movement of probe tip 18 with dithering is near zero. Furthermore, small changes in the frequency of the dithering signal cannot be expected to change the gain of the system, and hence the amplitude of tip movement due to dithering. This reasoning indicates that the same results can be obtained through comparisons of (ΔA) or of (ΔA/ΔZ) with appropriate threshold values; the value of (ΔZ) can be eliminated as a constant.

If the amplitude difference (ΔA) is not greater than the predetermined threshold value, as determined in step 226, the system proceeds to step 232, where a comparison between the amplitude (A) of tip vibration and a setpoint value is made. If this amplitude (A) is determined to be less than the setpoint value, the amplitude of the signal driving excitation segment 34 is increased in step 234 to overcome an increase in vibration damping with a reduction in separation distance between the vibrating tip 18 and the sample surface 24. From step 234, the system returns to step 232, so that the amplitude (A) is measured again. A more thorough explanation of the reasoning behind this portion of the routine is given above in reference to FIGS. 8 and 9.

If the amplitude (A) is determined in step 232 to be not less than the setpoint value, the system proceeds to step 236, where a comparison is made of the phase angle (φ) between the driving voltage signal applied to excitation segment 34 and the vibration of probe tip 18 and a predetermine threshold value for this phase angle (φ). If this phase angle has risen above the threshold value, the frequency of the driving voltage signal applied to excitation segment 34 is decreased by a predetermined incremental value in step 238, under the assumption that the increase in the phase angle (φ) is due to a lowering of the resonant frequency of the cantilever 14, occurring along with lowering the separation distance between the probe tip 18 and the sample surface 24. From step 238, the system returns to step 236, so that the phase angle (φ) is measured again before proceeding. A more thorough explanation of the reasoning behind this portion of the routine is given above in reference to FIGS. 6 and 7.

If a determination is made in step 236 that the phase angle (φ) is less than the threshold value established for it, the separation between tip 18 and surface 24 is reduced by a single step in step 240, using the large range piezoelectric actuator 30. This process is repeated, with the separation distance being reduced in step 240 until the amplitude difference (ΔA) is determined to be greater than the threshold level in step 226, so that the routine is exited in step 230.

After the routine is exited in step 230, the device is ready to begin the examination of sample surface 24 in a scanning mode. Operation in this mode preferably begins with the separation distance (Z) and the frequency of vibration (ω) that are stored in step 228.

While the invention has been described in its preferred forms or embodiments with some degree of particularity, it is understood that this description has been given only by way of example and that numerous changes in the details of construction, fabrication and use, including the combination and arrangement of parts, may be made without departing from the spirit and scope of the invention.

What is claimed is:

1. A scanning force microscope for examining a surface of a sample, wherein said scanning force microscope comprises:

a probe assembly including a probe tip directed toward said surface of said sample, and a cantilever having proximal and distal ends, wherein said probe tip is fastened to said distal end of said cantilever;

an excitation oscillator producing an excitation signal oscillating at an excitation frequency;

an excitation drive applying vibrating motion, in an engagement direction toward said sample surface and opposite to said engagement direction, to said proximal end of said cantilever, and thereby through said cantilever to said probe tip, wherein said vibrating motion is generated at said excitation frequency in response to said excitation signal;

a scanning drive applying relative motion between said probe tip and said sample along a plane perpendicular to said engagement direction;

a motion detector detecting motion of said probe tip, in said engagement direction and opposite thereto, in a range of frequencies including said excitation frequency, with said motion detector providing a tip motion signal corresponding to said motion of said tip;

a demodulator determining an amplitude of vibration of said tip motion signal, wherein said demodulator includes signal generation means for generating a first intermediate signal locked in phase with said tip motion signal, a first multiplier multiplying said tip motion signal by said first intermediate signal to form a second intermediate signal, and a first low-pass filter through which said second intermediate signal is passed to form an amplitude signal indicating an amplitude of said tip motion signal; and an engagement drive moving said proximal end of said cantilever in said engagement direction, and opposite thereto, in response to variations in said amplitude signal.

2. The scanning force microscope of claim 1, wherein said signal generation means includes:

a variable phase adjusting circuit having a signal input to which said excitation signal is applied, a signal output forming said first intermediate signal, and a phase input to which a voltage level is applied to determine a phase angle relationship between said signal input and said signal output; and a phase correction circuit driving said phase input of said variable phase adjusting circuit so that said first intermediate signal is locked in phase with said tip motion signal.

3. The scanning force microscope of claim 2, wherein said phase correction circuit includes:

a limiter generating a modified vibration signal in response to said tip motion signal;

a fixed phase adjusting circuit applying a ninety-degree phase adjustment to said first intermediate signal to form a phase adjusted signal;

a second multiplier multiplying said modified vibration signal by said phase adjusted signal;

a second low-pass filter through which an output of said second multiplier is passed; and an integrator through which an output of said second low-pass filter is passed to form a phase control signal applied to said phase input of said variable phase adjusting circuit.

4. The scanning force microscope of claim 3, wherein said scanning force microscope additionally comprises a computing system causing said scanning force microscope to operate in a final approach mode in which said probe tip is moved into proximity with said surface of said sample and in a scanning mode in which said scanning drive is operated so that said surface of said sample is examined by said probe tip, and phase comparison means for comparing said phase control signal with a pre-determined level therefor, and said excitation oscillator changes said excitation frequency during operation of said scanning force microscope in said final approach mode in response to an output of said phase comparison means, wherein said excitation frequency is lowered when said phase control signal exceeds said pre-determined level therefor.

5. The scanning force microscope of claim 4, additionally comprising:

a dithering oscillator producing a dithering signal oscillating at a dithering frequency, wherein said dithering frequency is substantially lower than said excitation frequency;

a dithering drive applying vibrating motion in said engagement direction and opposite thereto to said proximal end of said cantilever in response to said dithering signal during operation of said scanning force microscope in said final approach mode;

signal processing means for determining a change in said amplitude signal occurring at said dithering frequency in response to application of said vibrating motion by said dithering drive; and comparison means for terminating said approach mode when said change in said amplitude signal exceeds a pre-determined threshold level therefor.

6. The scanning force microscope of claim 1, additionally comprising:

a computing system causing said scanning force microscope to operate in a final approach mode in which said probe tip is moved into proximity with said surface of said sample and in a scanning mode in which said scanning drive is operated so that said surface of said sample is examined by said probe tip;

a dithering oscillator producing a dithering signal oscillating at a dithering frequency, wherein said dithering frequency is substantially lower than said excitation frequency;

a dithering drive applying vibrating motion in said engagement direction and opposite thereto to said proximal end of said cantilever in response to said dithering signal during operation of said scanning force microscope in said final approach mode;

signal processing means for determining a change in said amplitude signal occurring at said dithering frequency in response to application of said vibrating motion by said dithering drive; and comparison means for terminating said approach mode when said change in said amplitude signal exceeds a pre-determined threshold level therefor.

7. The scanning force microscope of claim 6, wherein operation in said scanning mode begins with said probe tip operating at an engagement distance established when said final approach mode is terminated.

8. The scanning force microscope of claim 6, wherein said excitation oscillator increases an amplitude of said excitation signal when said amplitude signal falls below a pre-determined level while said scanning force microscope is operating in said final approach mode.

9. The scanning force microscope of claim 8, wherein operation in said scanning mode begins with said excitation signal at an amplitude established when said final approach mode is terminated.

10. The scanning force microscope of claim 6, wherein said scanning force microscope additionally comprises phase determining means for measuring a phase angle between said tip motion signal and said excitation signal, and said excitation oscillator operates in response to said phase determining means to lower said excitation frequency when said phase angle between said tip motion signal and said excitation signal exceeds a pre-determined threshold therefor.

11. The scanning force microscope of claim 10, wherein operations in said scanning mode begins with said excitation frequency at a level established when said final approach mode is terminated.

12. The scanning force microscope of claim 6, wherein said scanning force microscope additionally includes a drive motor moving said proximal end of said cantilever in said engagement direction, and opposite thereto; and said computing system additionally causes said scanning force microscope to operate in an initial approach mode before said final approach mode, wherein said initial approach mode is terminated upon detection of a change in said amplitude signal.

13. A demodulator for determining an amplitude of tip vibration within a scanning force microscope from a tip motion signal, wherein said demodulator comprises:

signal generation means for generating a first intermediate signal locked in phase with said tip motion signal;

a first multiplier multiplying said tip motion signal by said first intermediate signal to form a second intermediate signal; and a first low-pass filter through which said second intermediate signal is passed to form an amplitude signal indicating an amplitude of said tip motion signal.

14. The demodulator of claim 13, wherein said signal generation means includes:

a variable phase adjusting circuit having a signal input to which said excitation signal is applied, a signal output forming said first intermediate signal, and a phase input to which a voltage level is applied to determine a phase angle relationship between said signal input and said signal output; and a phase correction circuit driving said phase input of said variable phase adjusting circuit so that said first intermediate signal is locked in phase with said tip motion signal.

15. The demodulator of claim 14, wherein said phase correction circuit includes:

a limiter generating a modified vibration signal in response to said tip motion signal;

a fixed phase adjusting circuit applying a ninety-degree phase adjustment to said first intermediate signal to form a phase adjusted signal;

a second multiplier multiplying said modified vibration signal by said phase adjusted signal;

a second low-pass filter through which an output of said second multiplier is passed; and an integrator through which an output of said second low-pass filter is passed to form a phase control signal applied to said phase input of said variable phase adjusting circuit.

16. The demodulator of claim 14, wherein an output level of said phase correction is compared with a setpoint level to determine a phase relationship between said excitation signal and said tip motion signal.

* * * * *